(12) United States Patent
Tomita

(10) Patent No.: US 7,992,608 B2
(45) Date of Patent: Aug. 9, 2011

(54) PNEUMATIC TIRE WITH TREAD HAVING CROSS-SECTIONAL SHAPE OF CIRCUMFERENTIAL GROOVES VARYING IN STEPWISE MANNER ALONG CIRCUMFERENTIAL DIRECTION

(75) Inventor: Arata Tomita, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1202 days.

(21) Appl. No.: 10/577,901

(22) PCT Filed: Oct. 28, 2004

(86) PCT No.: PCT/JP2004/016007
§ 371 (c)(1),
(2), (4) Date: Feb. 22, 2007

(87) PCT Pub. No.: WO2005/039895
PCT Pub. Date: May 6, 2005

(65) Prior Publication Data
US 2007/0251622 A1    Nov. 1, 2007

(30) Foreign Application Priority Data

Oct. 29, 2003 (JP) .................................. 2003-369437

(51) Int. Cl.
*B60C 11/04* (2006.01)
*B60C 11/13* (2006.01)
(52) U.S. Cl. ......... 152/209.21; 152/209.22; 152/209.24; 152/901
(58) Field of Classification Search ............ 152/209.21, 152/209.22, 209.23, 209.24, 901
See application file for complete search history.

(56) References Cited

U.S. PATENT DOCUMENTS

| 3,664,402 A | * | 5/1972 | Montagne | 152/209.24 |
| 4,865,099 A | * | 9/1989 | Goergen | 152/209.21 |
| 5,246,049 A | | 9/1993 | Ramcke et al. | |
| 2008/0000565 A1 | * | 1/2008 | Tomita | 152/209.13 |

FOREIGN PATENT DOCUMENTS

JP    60-197409 A    10/1985
(Continued)

OTHER PUBLICATIONS

Machine translation for Japan 09-011708.*

(Continued)

*Primary Examiner* — Steven D Maki
(74) *Attorney, Agent, or Firm* — Sughrue Mion, PLLC

(57) ABSTRACT

A pneumatic tire where the positions of the groove deepest portions (33*btm*) in the circumferential grooves (33) vary in a predetermined cycle along the circumferential direction in a width direction of the tread within the circumferential grooves (33). Moreover, depth direction positions, where a groove bottom surface of the circumferential groove (33) contacts with each of perpendicular lines (perpendicular line $P_1$, perpendicular line $P_2$) which are perpendicular or approximately perpendicular to a tread surface and which pass respectively through edges (edge portion 11*eg*, edge portion 12*eg*) of the land portions on a side of each of the circumferential grooves of ribs, as well as angles which are formed by the perpendicular lines and a section line of a cross-section of the groove bottom surface in the width direction of the tread surface vary in the predetermined cycle along the circumferential direction. In the pneumatic tire, uneven wear of the tire caused by lateral force applied in a width direction of a tread is suppressed and wet performance is improved.

9 Claims, 7 Drawing Sheets

FOREIGN PATENT DOCUMENTS

| | | | |
|---|---|---|---|
| JP | 02-081704 | * | 3/1990 |
| JP | 02-088311 B2 | | 3/1990 |
| JP | 02-212203 | * | 8/1990 |
| JP | 05-000606 A | | 1/1993 |
| JP | 06-156017 A | | 6/1994 |
| JP | 09-011708 | * | 1/1997 |
| JP | 09-011708 A | | 1/1997 |
| JP | 2001-187519 A | | 7/2001 |
| JP | 2001-219714 | * | 8/2001 |
| JP | 2001-294021 A | | 10/2001 |
| JP | 2002-512575 A | | 4/2002 |

OTHER PUBLICATIONS

Machine translation for Japan 2001-219714 (no date).*
European Search Report dated Feb. 13, 2009 (3 pages).
Office Action JP2005-515032 Mar. 9, 2010 with English Translation.

* cited by examiner

FIG. 5
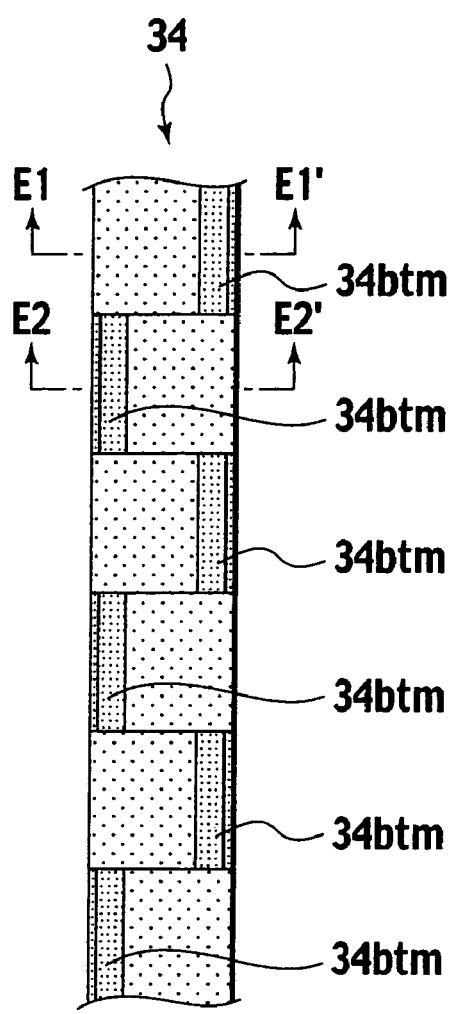
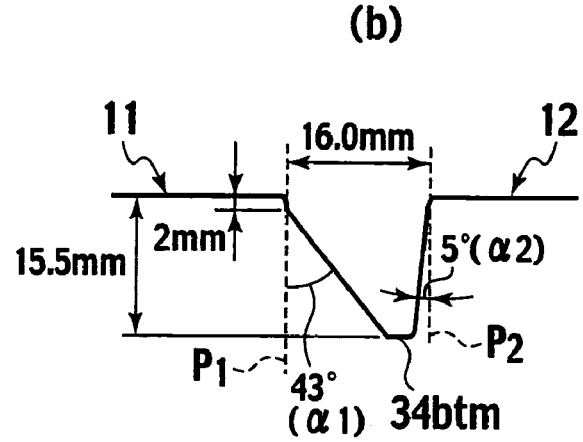
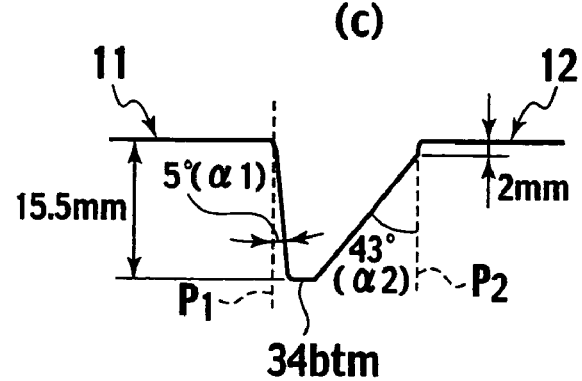

FIG. 6
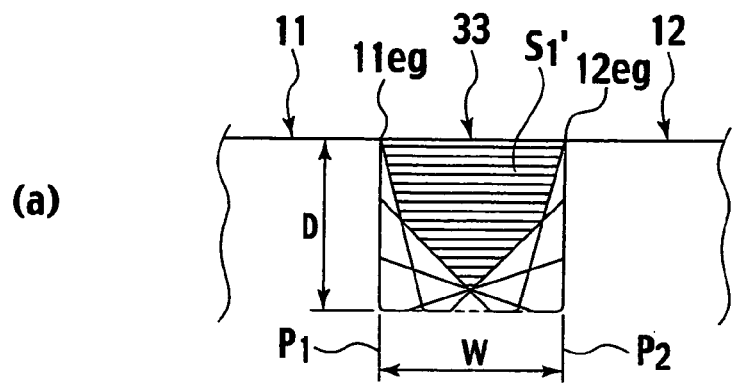
(a)
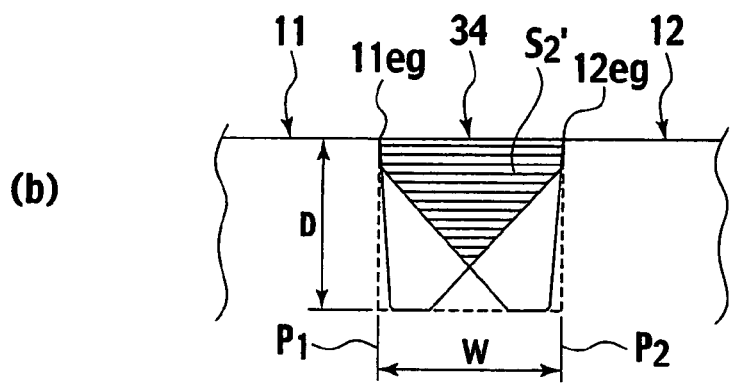
(b)
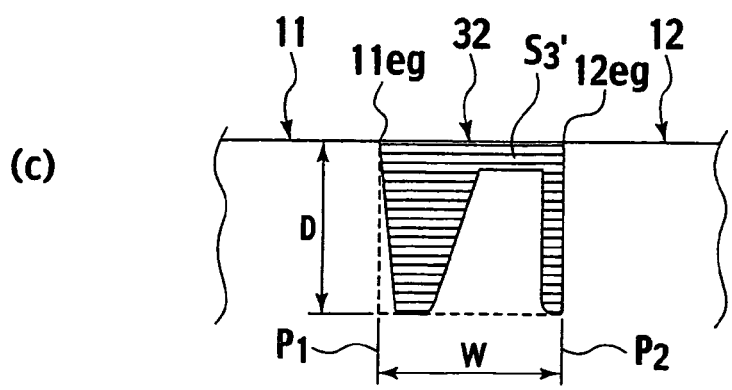
(c)

PNEUMATIC TIRE WITH TREAD HAVING CROSS-SECTIONAL SHAPE OF CIRCUMFERENTIAL GROOVES VARYING IN STEPWISE MANNER ALONG CIRCUMFERENTIAL DIRECTION

TECHNICAL FIELD

The present invention relates to a pneumatic tire which includes circumferential grooves deposited on along a circumferential direction of a tread and land portions divided by the circumferential grooves, particularly, shapes of circumferential grooves for a heavy duty pneumatic tire.

BACKGROUND ART

Heretofore, for a pneumatic tire, especially, a heavy duty pneumatic tire, there has been widely used a method, in which "fine ribs," provided with a step on a tread surface, are disposed on the tread in order to suppress uneven wear of shoulder ribs. In more detail, this method is for reducing shear forces applying to edges of the shoulder ribs in a driving direction, by producing shear forces in an opposite direction to the driving direction of a vehicle. (For example, Japanese Patent Laid-open No. Hei 2-88311 (pp. 2-3, FIG. 2))

Here, FIG. 1(*a*) is an expanded plan view showing a part of the tread of a heavy duty pneumatic tire having "fine ribs" such as above. Meanwhile, FIG. 1(*b*) is a sectional view taken along a line A-A' of the heavy duty pneumatic tire shown in FIG. 1(*a*).

As shown in FIGS. 1(*a*) and 1(*b*), circumferential grooves 31 are disposed on a tread TR1 on both sides of an equator line CL of the tire, and second ribs 12 are disposed on the outside of the respective circumferential grooves 31. In addition, outside the second ribs 12, straight circumferential grooves 32 are also disposed.

In addition, fine ribs 21 with a step having a different level from the surface of the tread TR1 are disposed in the circumferential grooves 32. Shoulder ribs 11 are, further, disposed outside the circumferential grooves 32.

As described above, for a conventional heavy duty pneumatic tire such as that shown in FIGS. 1(*a*) and 1(*b*), a portion of the step formed by the fine ribs 21 and the circumferential grooves 32 allows shear forces to be produced in an opposite direction to a driving direction of a vehicle.

Furthermore, as the methods for suppressing uneven wear of shoulder ribs or the like, there has been used a method, in fact, in which is for suppressing rib sear, that edges of the ribs are worn out locally and unevenly by varying shapes of side surfaces of ribs in a sine pattern along a circumferential direction when viewed from above. (Translated National Publication of Patent Application No. 2002-512575 (pp. 14-15, FIGS. 1-2))

However, the above described method has following problems. One of the problems is that under a circumstance where a force in the width direction, i.e. a lateral force, is more dominant than that in the circumferential direction, application of the method employing the fine ribs with a step having a different level from the surface of the tread is hardly effective in suppressing uneven wear of a shoulder ribs, especially taper wear of shoulder ribs in which the shoulder ribs are unevenly worn out in a tapered shape.

Here, FIG. 1(*c*) is an enlarged view showing a part of a cross-section of the conventional heavy duty pneumatic tire shown in FIG. 1(*b*) in the width direction of the tread (in the direction of A-A'). Referring to FIG. 1(*c*) as an example, this problem will be described in details. In a case where a force, i.e. a lateral force F, in the width direction of the tread TR1 from an outside thereof, is applied to a conventional heavy duty pneumatic tire, since an angle formed by a grove bottom surface 32*bt* and a rib-side surface 11*sd* is set to an approximately perpendicular angle, when the tread TR1 contacts with the ground, the circumferential groove 32 is shrunk, starting at a contact point V at which the groove bottom surface 32*bt* and the shoulder rib 11 contact, and the shoulder rib 11 undergoes a large displacement in the width direction, that is, toward an interior of the tread TR1. The conventional method, by which the uneven wear is suppressed with the fine ribs 21 and circumferential grooves 32 are in reality not so effective in suppressing an occurrence and development of a wear core on an edge portion 11*eg* of the shoulder rib 11 due to the lateral force F applied.

There is also another problem that, since the fine ribs 21 are provided in the circumferential grooves 32 in general as shown in FIG. 1(*c*), effective groove areas of the circumferential grooves 32 are reduced and drainage performance is impaired. Therefore, when the ground is wet, a driving stability of a vehicle, i.e. wet performance of a vehicle, is deteriorated.

Moreover, the method, as disclosed in the translated National Publication of Patent Application No. 2002-512575, in which shapes of side surfaces of ribs are varied along a circumferential direction, has a following problem. In some cases, the method is effective to a certain extent not only for suppressing the uneven wear caused by a force applied from the circumferential direction to a heavy duty pneumatic tire, but also, as a consequence, for suppressing the uneven wear caused by a force being laterally applied thereto. However, in general, since the shapes of the side surface of the ribs are varied along the circumferential direction, effective groove areas of the circumferential grooves are reduced. For this reason, the drainage performance as described above is impaired and the wet performance is hence deteriorated. Accordingly, when heavy duty pneumatic tires having such features as described above are mounted on a steering shaft, it is clearly shown up that the driving stability is deteriorated, and therefore it has been a serious problem.

Therefore, in consideration of the problems described above, an object of the present invention is to provide a pneumatic tire, especially a heavy duty pneumatic tire, capable of suppressing the uneven wear due to the lateral force in a width direction of the tread and of enhancing a wet performance.

DISCLOSURE OF THE INVENTION

In solving the above described problems, at first, inventors attached small slip angles to a conventional heavy duty pneumatic tire, and from an outside of a tread, made a thorough observation on a behavior of the tread when a lateral force is applied.

Through the observation, it was observed that, when the shoulder ribs located on an outer portion of the tread, i.e. on a side where the lateral force was applied, came into contact with a ground, the circumferential grooves placed between the shoulder ribs and the second ribs shrunk, and then a contact position with the ground was near the second ribs.

It was revealed that, since the shoulder ribs in contact with the ground near the second ribs were released, when the shoulder ribs were kicked out, in other words, when they were moving away from the ground due to a rotation of the heavy duty pneumatic tire, a slip of the tread in an outward direction became large, and, consequently, shear forces in an interior direction of the tread became large, whereby, wear developed.

It was also revealed that shrinkages of the circumferential grooves were caused by deformations of groove bottom surfaces of the circumferential grooves and those of side surfaces of the shoulder.

Therefore, in consideration of the above observations, the present invention has following features. A first feature of the present invention is that, a pneumatic tire includes circumferential grooves (for example, circumferential groove 33) disposed along a circumferential direction of a tread (for example, tread TR10) and land portions divided (shoulder ribs 11 and second ribs 12) by the circumferential grooves. In addition, positions of groove deepest portions (for example, a groove deepest portion 33btm) in the circumferential grooves vary in a predetermined cycle (for example, a length equal to or less than one-half of a contact length, which is defined as a length of a portion where the tread is in contact with the ground) along the circumferential direction in a width direction of the tread within the circumferential grooves. Moreover, depth direction positions, where a groove bottom surface of the circumferential groove contacts with each of perpendicular lines (perpendicular lines P) which are perpendicular or approximately perpendicular to a tread surface and which pass respectively through edges (edge portion 11eg or edge portion 12eg) of the land portions on a side of each of the circumferential grooves, as well as angles (for example, α1 and α2), which are formed by the perpendicular lines and a section line of a cross-section of the groove bottom surface in the width direction of the tread surface with a vertex in the depth direction positions, vary in the predetermined cycle along the circumferential direction.

According to the above described features, the groove deepest portion of the circumferential grooves is varied along the circumferential direction in the predetermined cycle in the width direction of the tread in the circumferential grooves. The depth direction positions where the groove bottom surface of the circumferential groove contacts with the perpendicular lines which are perpendicular or approximately perpendicular to the tread surface and which pass through the edges of the land portions on the side of the circumferential groove, as well as the angles, which are formed, with a vertex in the depth direction position, by the perpendicular lines and the section line of a cross-section of the groove bottom surface in the width direction of the tread, are varied in the predetermined cycle along the circumferential direction.

Therefore, when a lateral force is applied to the pneumatic tire, especially the heavy duty pneumatic tire, deformation positions of the groove bottom surface and the side surfaces of the shoulder ribs are dispersed, whereby it is possible to suppress shrinkages of the circumferential grooves, that is, displacement of the shoulder ribs in the width direction of the tread.

As described in the above, when the displacement of the shoulder ribs in the width direction is suppressed, it is possible to reduce shear forces which occurs in an interior direction of the tread TR10 when the shoulder ribs are kicked. Therefore it suppresses uneven wear of the shoulder ribs, in concrete terms, a loss of one of the edges of the shoulder ribs or the like, taper wear, and heel and toe wear (H & T wear) which occurs when the tread is worn by repeatedly sheared in a certain direction.

Here, for example, in a case where the deformation of the shoulder ribs are suppressed by inclining the side surface of the circumferential groove, and by expanding a lower portion of the shoulder ribs located on a axis side of a rotation of the tire, without changing the depth direction position, where the groove bottom surface of the circumferential groove contacts with the perpendicular lines, which are perpendicular to the tread surface and which pass through the edges of the shoulder ribs, that is, the side surface of the shoulder rib, the deformation of the shoulder ribs are able to be suppressed slightly. However, in this case, positions where the side surface of the shoulder rib deforms are concentrated at a specific depth direction position in the circumferential groove.

In addition, the deformation of the groove bottom surface of the circumferential groove is not able to be suppressed by inclining the side surface of the shoulder rib. As a result, an effect of suppressing wear of the shoulder rib due to a lateral force cannot be effectively produced. On the other hand, when the side surface of the shoulder rib is inclined to an extreme extent to produce a more effect of suppressing the deformation of the shoulder rib, the cross-sectional area of the circumferential groove is reduced and, hence, drainage performance, i.e. wet performance, is deteriorated.

In a case of a method in which the groove deepest portion are varied along the circumferential direction in the width direction in addition to inclining of the side surface of the shoulder rib, for example, the method as disclosed in the translated National Publication of Patent Application No. 2002-512575, shapes of side surfaces of the shoulder rib and a second rib are varied in a sine pattern along the circumferential direction when viewed from above, the deformation of the groove bottom surface of the circumferential groove is suppressed, and therefore an effect of suppressing the deformation of the side surface of the shoulder rib can be enhanced.

However, in the above method, since the depth direction position at which the groove bottom surface of the circumferential groove contacts with the side surface of the shoulder rib is retained constant, the effect of suppressing the deformation of the side surface of the shoulder rib becomes smaller.

The second feature of the present invention is that, in the first feature of the present invention, when a maximum groove cross-sectional area S is defined as an area of a rectangle formed by each of the edges of the land portion on the side of the circumferential groove, and by points where the perpendicular lines, which are perpendicular or approximately perpendicular to the tread surface and which pass through the edges, intersect perpendicularly with a line which is parallel to the tread surface and tangent to the groove deepest portion, an effective groove cross-sectional area S' corresponding to a portion forming the circumferential groove along the entire circumferential direction satisfies S'≧0.45S in the maximum groove cross-sectional area S.

In this feature, the uneven wear of the shoulder ribs caused by the shrinkage of the circumferential groove can be suppressed, and also drainage performance can be further enhanced.

To be more specific, it is assumed that the section line of the cross-section of the circumferential groove in the width direction of the tread is displayed transparently along the entire circumference of the tread, a hypothetical cross-section, that is, a see-through portion, is constructed by joining of points and lines which are located at innermost portions in a displayed contour. In other words, the effective groove cross-sectional area (S') corresponds to a groove cross-sectional area which allows water, which has entered in the circumferential groove, to flow out smoothly without being interrupted by the groove bottom surface, and the sides of the shoulder ribs of the circumferential groove.

In a conventional method in which fine ribs are disposed in circumferential grooves, an effective groove cross-sectional area (S') is not greater than one-half of the maximum groove cross-sectional area (S). This method has problems that enhancement of drainage performance, i.e. wet performance, is difficult along with occurrence of large shrinkage of the circumferential groove.

On the other hand, the circumferential grooves disposed on the pneumatic tire of the present invention are capable of maintaining the drainage performance and of suppressing the shrinkage of the circumferential groove caused by a lateral force by means of inclination of the side surfaces of ribs to a necessary minimum extent. In other words, the present invention makes it possible to suppress uneven wear of the shoulder ribs due to the shrinkage of the circumferential groove caused by a lateral force, i.e. the displacement of the shoulder ribs in the width direction of the tread, and to further enhance the wet performance.

In addition to the above mentioned effects, the shape of this circumferential groove is superior to that of a conventional circumferential groove in reducing air column resonance (pattern air pumping sound), whereby it is possible to suppress so-called driving noise.

Furthermore, for the pneumatic tires in the first and second features of the present invention, it is preferable that, when an angle close to a rotation center of the tire is denoted as α1 and an angle close to the tread surface is denoted as β1, the angles being respectively formed, with a vertex in the depth direction position, by one of the perpendicular lines and the section line of the cross-section of the groove bottom surface in the width direction, at which the groove bottom surface contacts with the perpendicular line passing through the edge of the land portion (for example, a shoulder rib) disposed on the shoulder side of the tread, and when an angle close to the rotation center of the tire is denoted as α2 and an angle close to the tread surface is denoted as β2, the angles being respectively formed, with a vertex in the depth direction position by the other of the perpendicular line and the section line of the cross-section of the groove bottom surface in the width direction, at which the groove bottom surface contacts with the perpendicular line passing through an edge of a second land portion which is the land portion (for example, a second rib) disposed on a center side of the tread, a relationship α2<β2 is satisfied in a region where a relationship α1>β1 is satisfied, and a relationship α2>β2 is satisfied in a region where a relationship α1<β1 is satisfied.

Furthermore, it is preferable for the pneumatic tires in the first and second features that the depth direction position are varied in such a way that the closer the position of the groove deepest portion is to the land portion, the closer the depth direction position is to the tread surface.

Hence, it is possible to provide the pneumatic tire, especially the heavy duty pneumatic tire, which is capable of suppressing the deformation of the groove bottom surface and the shoulder ribs along the circumference direction.

BRIEF DESCRIPTION OF THE DRAWINGS

FIG. 5 is views showing a constitution of a circumferential groove disposed on the pneumatic tire of the comparative example.

FIG. 6 is sectional views showing effective groove cross-sectional areas for the pneumatic tires of this embodiment, comparative example, and the conventional example.

Figure 1:
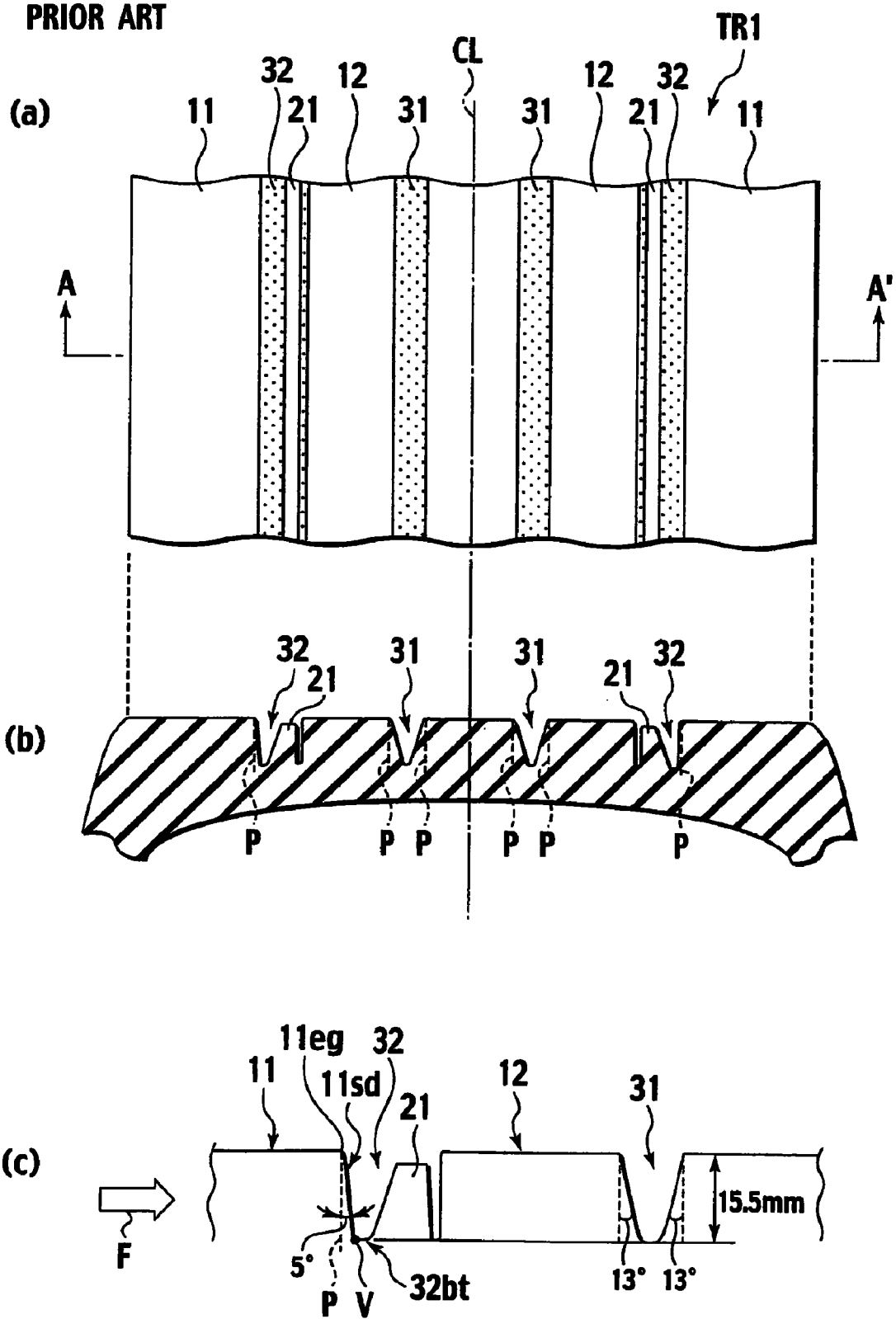
FIG. 1 is an expanded plan view showing a part of a tread of a conventional pneumatic tire and sectional views taken along a width direction of the tread.

EMBODIMENT MODE FOR CARRYING OUT THE INVENTION (A Constitution of a Pneumatic Tire According to an Embodiment of the Present Invention)

Hereinafter, a description will be provided for pneumatic tire according to an embodiment of the present invention with reference to the accompanying drawings. FIG. 2(a) is an expanded plan view showing a portion of a tread of a pneumatic tire (heavy duty pneumatic tire) of the embodiment. In addition, FIG. 2(b) is a sectional view showing a cross-section taken along a line B-B' of the heavy duty pneumatic tire shown in FIG. 2(a).

As shown in FIGS. 2(a) and 2(b), on a tread TR10, straight circumferential grooves 31 are disposed on both sides of a tire equator line CL, and second ribs 12 (land portions) are disposed outside the respective circumferential grooves 31.

Outside the second ribs 12, straight circumferential grooves 33 are disposed. Furthermore, outside the circumferential grooves 33, shoulder ribs 11 (land portions) are disposed. Additionally, in FIG. 2(b), while a belt, an inner liner, or the like are disposed under the circumferential grooves 31 and the circumferential grooves 33, i.e. on a side of an axis of rotation of the tire, they are omitted in the drawings according to this embodiment.

The circumferential grooves 31 are straight grooves which are disposed along a circumferential direction of the tread TR10 in parallel or approximately parallel with the tire equator line CL. In addition, as shown in FIG. 2(b), a cross-section of the circumferential groove 31 has a shape that tapers off toward a bottom surface of the grooves. Note that the circumferential grooves 31 are equal to those which are disposed on a tread TR1 of a conventional heavy duty pneumatic tire shown in FIG. 1(c). As shown in FIG. 1(c), the groove deepest portion of the circumferential grooves 31 are 15.5 mm in depth, and angles formed by perpendicular lines P being perpendicular to a surface of the tread TR1 and side walls of the circumferential groove 31 are set to 13°.

The circumferential grooves 33 are straight grooves which are formed between the shoulder ribs 11 and the second ribs 12. Note that, however, the circumferential grooves 31 and 33 are not necessarily straight.

As shown in FIG. 2(a), positions of groove deepest portions 33btm of the circumferential grooves 33 vary in a width direction of the tread TR10 along the circumferential direction of the tread TR10 inside the circumferential grooves 33 in a predetermined cycle.

As shown in FIG. 2(b), in the circumferential grooves 33, depth direction positions where the groove bottom surface of the circumferential grooves 33 contacts with perpendicular lines P which are perpendicular to the surface of the tread TR10 and which pass through the edge portion 11eg and the edge portion 12eg, as well as angles, which are formed by the perpendicular lines P and the section line of the cross-section of the groove bottom surface in the width direction of the tread with a vertex in the above depth direction positions, are varied in a predetermined cycle along the circumferential direction of the tread TR10. A more concrete composition of the circumferential grooves 33 will be described later.

The shoulder ribs 11 are straight ribs disposed: along the circumferential direction of the tread TR10; in parallel or approximately parallel with the tire equator line CL; and at outmost positions of the tread TR10.

The second ribs 12 are straight ribs disposed: along the circumferential direction of the tread TR10; in parallel or approximately parallel with the tire equator line CL; and adjacently to the circumferential grooves 33. Note that the shoulder ribs 11 and the second ribs 12 are not necessarily straight.

Figure 2:
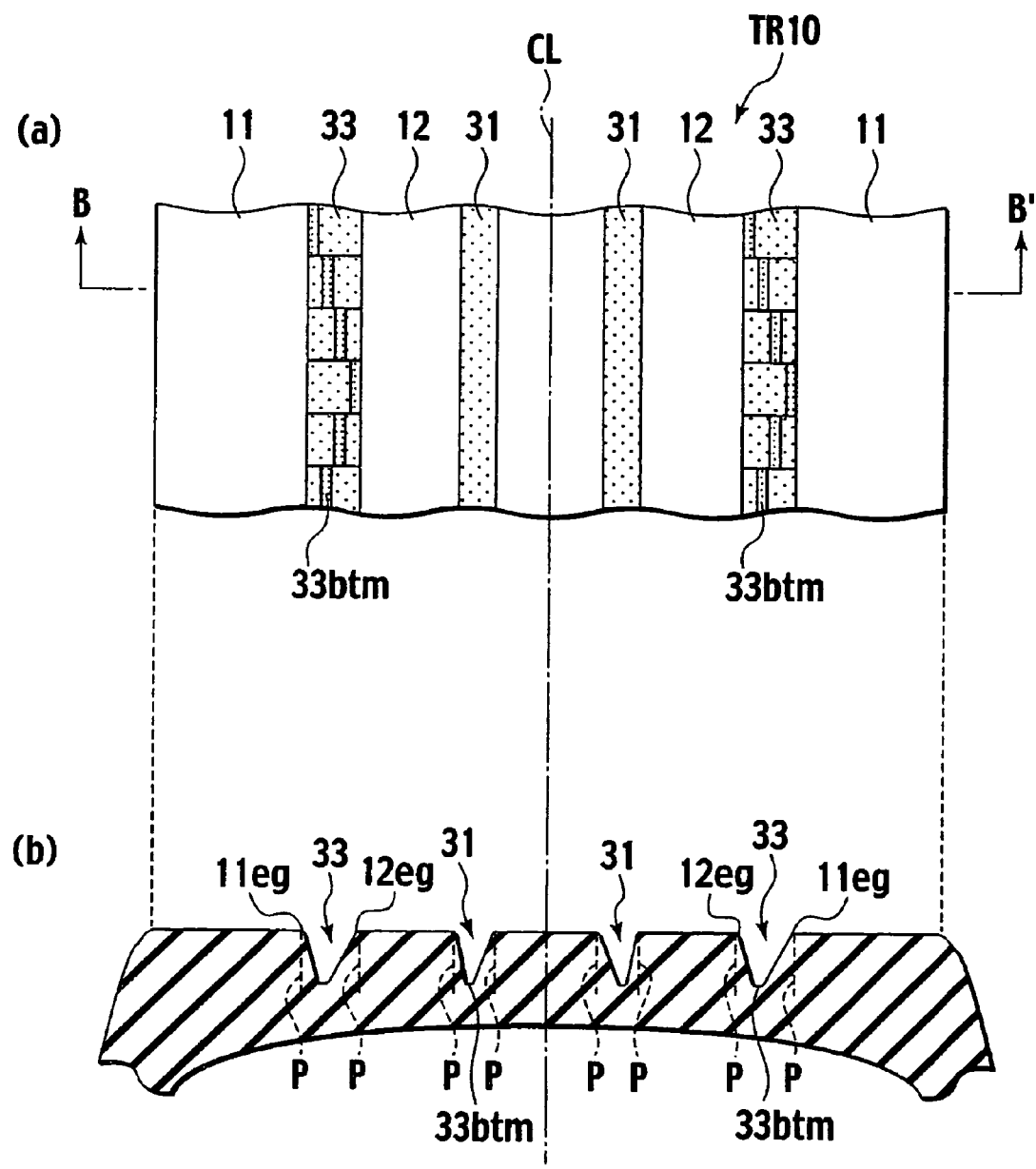
FIG. 2 is an expanded plan view showing a part of a tread of a pneumatic tire of an embodiment of the present invention and a sectional view taken along a width direction of the tread.

In carrying out this embodiment, numbers of the circumferential grooves 31, 33, and the second ribs 12 are not limited to those shown in FIGS. 2(*a*) and 2(*b*), and can be changed as needed.

(Constitution of the Circumferential Grooves of the Pneumatic Tire of this Embodiment)

Figure 3:
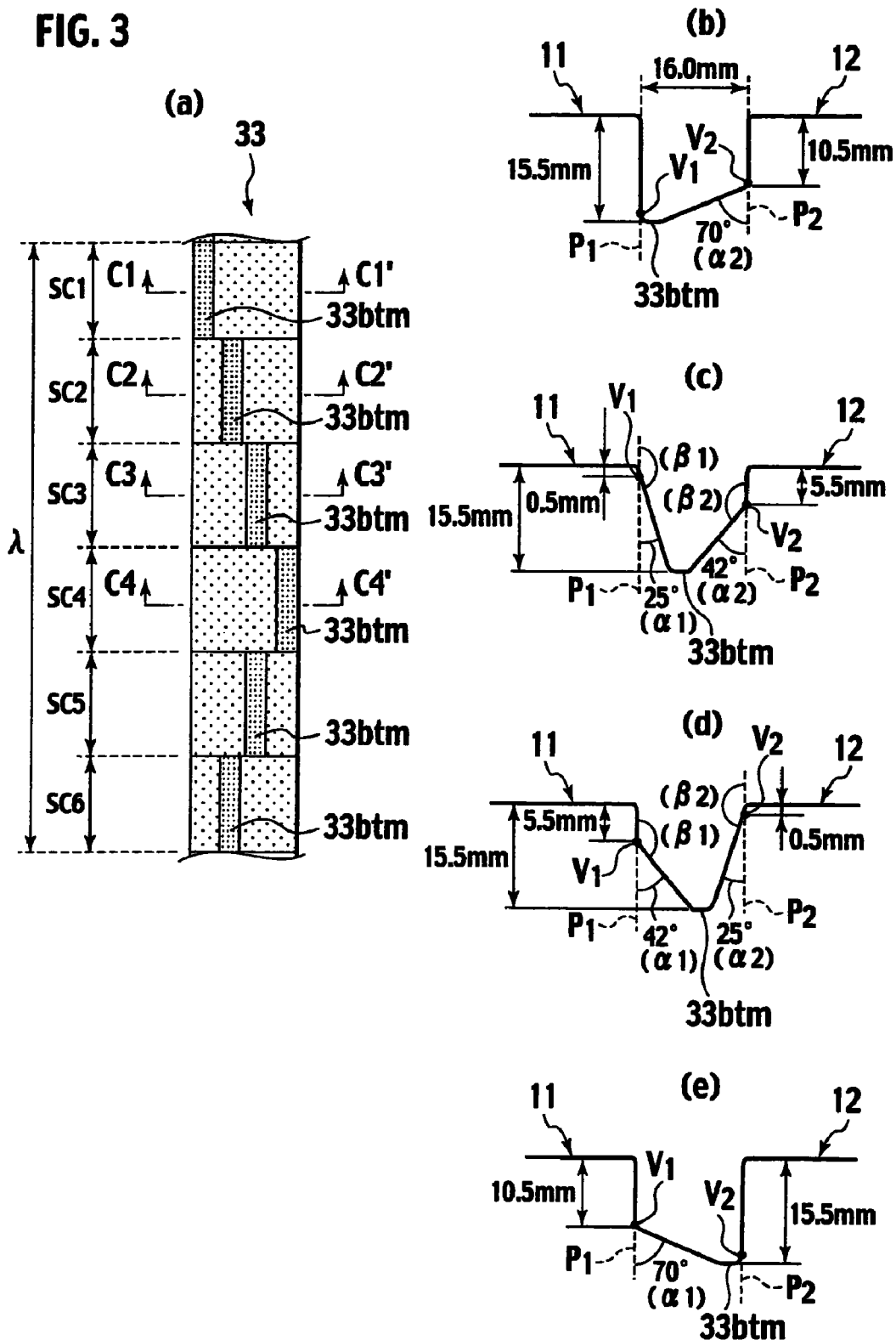
FIG. 3 is views showing a constitution of a circumferential groove disposed on the pneumatic tire of the embodiment of this embodiment.

Specific constitution of the circumferential grooves 33 will be described with reference to FIG. 3. FIG. 3(*a*) is an enlarged view showing the circumferential groove 33 disposed on the tread TR10.

In addition, FIG. 3(*b*) is a cross-sectional view of the circumferential groove 33 shown in FIG. 3(*a*) taken along a line C1-C1'. Similarly, FIGS. 3(*c*) to 3(*e*) are cross-sectional views of the circumferential groove 33 taken along lines C2-C2' to C4-C4', respectively. Hereinafter, shapes of each of the cross-sectional views of the circumferential groove 33 taken along the lines C1-C1' to C4-C4' will be described.

As shown in FIG. 3(*b*), in a cross-section of the circumferential groove 33 taken along the line C1-C1', a depth direction position (contact point $V_1$) at which the groove bottom surface contacts with a perpendicular line (hereinafter, referred to as perpendicular line $P_1$) is set to 15.5 mm from the surface of the tread TR10. The perpendicular line $P_1$ is perpendicular or approximately perpendicular to the surface of the tread TR10, passing through the edge portion 11*eg*. Meanwhile, a depth direction position (contact point $V_2$) at which the groove bottom surface contacts with a perpendicular line (hereinafter, referred to as perpendicular line $P_2$) is set to 10.5 mm from the surface of the tread TR10. The perpendicular line $P_2$ is perpendicular or approximately perpendicular to the surface of the tread TR10 that passes through the edge portion 12*eg*. Note that the "groove bottom surface" denotes a surface, including a groove deepest portion 33*btm*, between the contact points $V_1$ and $V_2$.

As shown in FIGS. 3(*b*) to 3(*e*), an angle on a side of a rotation axis of the tire, which is formed by the perpendicular line $P_1$ and the section line of the groove bottom surface with the contact point $V_1$ as a vertex, is hereinafter referred to as "$\alpha 1$". On the other hand, an angle on a side of the surface of the tread TR10, which is also formed by the perpendicular line $P_1$ and the groove bottom surface with the contact point $V_1$ as a vertex, is referred to as "$\beta 1$".

Furthermore, an angle on the side of the rotation axis of the tire, which is formed by the perpendicular line $P_2$ and the groove bottom surface with the contact point $V_2$ as a vertex is referred to as "$\alpha 2$", while an angle on the side of the surface of the tread TR10, which is formed by the perpendicular line $P_2$ and the section line of the groove bottom surface with the contact point $V_2$ as a vertex, is referred to as "$\beta 2$". In FIG. 3(*b*), $\alpha 2$ is set to 70°. In FIGS. 3(*b*) to 3(*e*), a width of the circumferential groove 33 is set to 16.0 mm.

As shown in FIG. 3(*c*), in a cross-section of the circumferential groove 33 taken along the line C2-C2', the depth direction position on the side of the shoulder rib 11 is set to 0.5 mm from the surface of the tread TR10. Meanwhile, the depth direction position on the side of the second rib 12 is set to 5.5 mm from the surface of the tread TR10. In addition, in the cross-section of the circumferential groove 33, $\alpha 1$ is set to 25° and $\alpha 2$ is set to 42°.

As shown in FIG. 3(*d*), in the cross-section of the circumferential groove 33 taken along the line C3-C3', the depth direction position on the side of the shoulder rib 11 is set to 5.5 mm from the surface of the tread TR10. Meanwhile, the depth direction position on the side of the second rib 12 is set to 0.5 mm from the surface of the tread TR10. In addition, in the cross-section of the circumferential groove 33, $\alpha 1$ is set to 42° and $\alpha 2$ is set to 25°.

As shown in FIG. 3(*e*), in the cross-section of the circumferential groove 33 taken along the line C4-C4', the depth direction position on the side of the shoulder rib 11 is set to 15.5 mm from the surface of the tread TR10. Meanwhile, the depth direction position on the side of the second rib 12 is set to 10.5 mm from the surface of the tread TR10. In addition, in the cross-section of the circumferential groove 33, $\alpha 1$ is set to 70°.

In this embodiment, by varying the shapes of the cross-sections of the circumferential grooves shown in FIGS. 3(*b*) to 3(*e*) along the circumferential direction of the tread TR10 in a predetermined cycle, the position of the groove deepest portions 33*btm* varies in the width direction of the tread TR10 in the circumferential groove 33. Thereby, the depth direction position of the contact points $V_1$ and $V_2$ in the circumferential groove 33, and the angles ($\alpha 1$, $\alpha 2$, $\beta 1$, $\beta 2$), which are formed by the perpendicular lines $P_1$ or $P_2$, and the section line of the cross-section of the groove bottom surface, are also able to be varied. In addition, the depths of the groove deepest portions 33*btm* in FIGS. 3(*b*) to 3(*e*) are all set to 15.5 mm.

Furthermore, in this embodiment, as shown in FIG. 3(*a*), the cross-sectional shapes of the circumferential groove 33 shown in FIGS. 3(*b*) to 3(*e*) are varied in a stepwise manner at each section ranging SC1 to SC6. Incidentally, the section SC5 is equal to that shown in FIG. 3(*d*), and the section SC6 is equal to that shown in FIG. 3(*c*).

When defining as a cycle ($\lambda$) a length entire from the intervals SC1 through SC6, i.e. the length from where the cross-sectional shape shown in FIG. 3(*b*) is varied to those shown in FIGS. 3(*c*) to 3(*e*), until where the shape shown in FIG. 3(*b*) is again repeated, it is preferable to set the cycle ($\lambda$) to be as short as possible in order to enhance a dispersion effect of deformation positions of the shoulder ribs 11 and the groove bottom surface. On the other hand, in case of setting the cycle ($\lambda$) to be long, a setting becomes close to one where the side surfaces of the shoulder ribs 11 are uniformly leaned, and thereby a shrinkage control effect of the grooves in the circumferential groove 33 becomes small.

Therefore, it is preferable that the cycle ($\lambda$) is set to a value which is enough small for the cycle ($\lambda$) to repeat at least twice or more in a contact length (L) of the tread TR10. That is, a relationship between the cycle ($\lambda$) and the contact length (L) should satisfy $\lambda \leq L/2$.

Note that, the "contact length" means a length where the tread TR10 of the heavy duty pneumatic tire in this embodiment contacts with a ground in a condition where the tire is pressed against the ground under a load corresponding to one that the tire mounted on a normal rim with a normal internal pressure is equipped with a front axle of a vehicle.

Features of the heavy duty pneumatic tire in this embodiment having the cross-sectional shapes shown in FIGS. 3(*b*) to 3(*e*) are summarized as follows.

(Feature 1) When the cross-sections of the circumferential groove 33 in the width direction of the tread TR10 is separated by a perpendicular line perpendicular to the surface of the tread TR10 in the center of the circumferential groove 33, the shapes of the cross-sections are asymmetric each other in more than 70% of an entire circumference. In addition, although the cross-sectional shapes of the shoulder ribs 11 and those of the second ribs 12 are not necessarily in opposite phase, it is important that an effective groove cross-sectional area (S') does not become small, as described below.

(Feature 2) Along the circumferential direction of the tread TR10, there are regions where $\alpha 1 > \beta 1$ is satisfied and regions where $\alpha 1 < \beta 1$ is satisfied. Meanwhile, along the circumferential direction of the tread TR10, there are regions where $\alpha 2 > \beta 2$ is satisfied and regions where $\alpha 2 < \beta 2$ is satisfied. In addition, in the region where $\alpha 1 > \beta 1$ is satisfied, $\alpha 2 < \beta 2$ is satisfied, while, in the regions where $\alpha 1 < \beta 1$ is satisfied, $\alpha 2 > \beta 2$ is satisfied.

(Feature 3) The depth direction position (contact point $V_1$), at which the perpendicular line $P_1$ contacts with the groove bottom surface on the side of the shoulder rib 11, periodically varies along the circumferential direction of the tread TR10; and the closer the position of the groove deepest portion 33*btm* in the width direction becomes to the shoulder rib 11, the closer the depth direction position (contact point $V_1$) becomes to the surface of the tread TR10. In addition, the depth direction position (contact point $V_2$), at which the perpendicular line $P_2$ contacts with the groove bottom surface on the side of the second rib 12, also periodically varies along the circumferential direction of the tread TR10, and the closer the position of the groove deepest portion 33*btm* in the width direction becomes to the second rib 12, the closer the depth direction position (contact point $V_2$) becomes to the surface of the tread TR10.

Next, the effective groove cross-sectional area (S') of the circumferential groove 33 will be described with reference to FIG. 6(*a*). As described above, the effective groove cross-sectional area is a groove cross-sectional area corresponding to a region, where the circumference groove is formed along the entire circumference of the tread TR10, in a maximum groove cross-sectional area S. Here, the maximum groove cross-sectional area S is defined as an area of a rectangle formed by each of the edge portions 11*eg* and 12*eg* and by points where the perpendicular lines $P_1$ and $P_2$ intersect perpendicularly with a line which is tangent to the groove deepest portion 33*btm* and is parallel to the surface of the tread TR10.

To be more specific, assuming that the section line of the cross-section of the circumferential groove 33 in the width direction of the tread TR10 is displayed transparently along the entire circumference of the tread TR10, a hypothetical cross-section, that is, a see-through portion, is constructed by joining of points and lines which are located at innermost portions in a displayed contour. That is, the effective cross-sectional area (S') corresponds to a groove cross-sectional area which allows water, which has entered in the circumferential groove 33, to flow out smoothly without being interrupted by the groove bottom surface, and the sides of the shoulder ribs 11, and the second ribs 12 of the circumferential groove 33.

In this embodiment, in FIG. 6(*a*), the effective groove cross-sectional area ($S_1$') of the circumferential groove 33 which is the area of a region marked with horizontal lines satisfies $S_1' \geqq 0.45S$, where S denotes the maximum groove cross-sectional area S is defined by a product of the width W and the groove maximum depth D.

(Constitution of a Pneumatic Tire for a Comparative Example)

Next, a heavy duty pneumatic tire for a comparative example will be described, which was produced for conducting comparative evaluations with the heavy duty pneumatic tire of the present embodiment, which will be described later. Hereinafter, only components different from those of the heavy duty pneumatic tire of the aforementioned present embodiment will be described, and the same components as those of the heavy duty pneumatic tire of the aforementioned present embodiment will be called as the same reference numerals, of which descriptions will be omitted.

Figure 4:
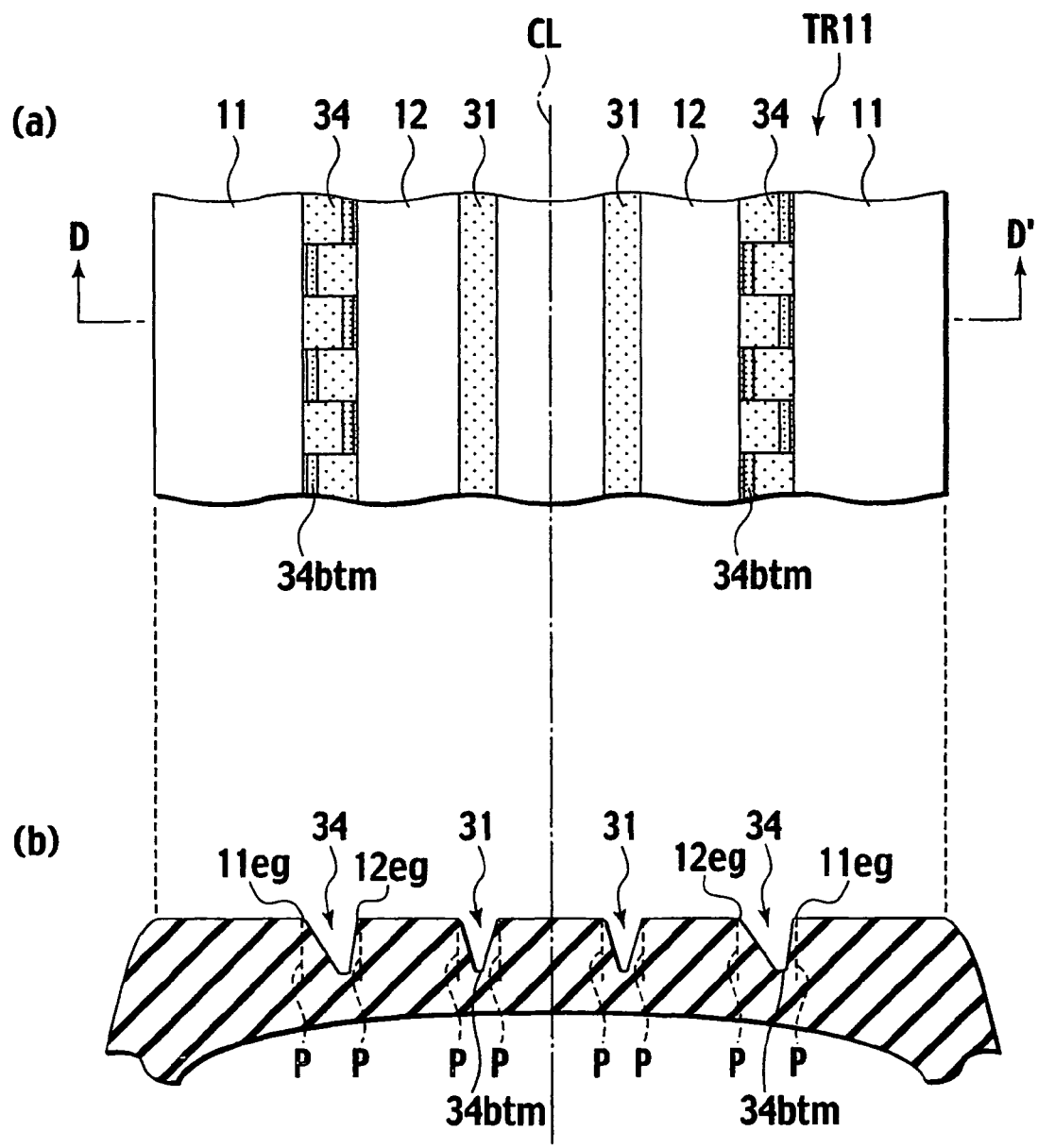
FIG. 4 is an expanded plan view showing a part of a tread of a pneumatic tire of a comparative example a sectional view taken along the width direction of the tread.

FIG. 4(*a*) is an expanded plan view showing a portion of a tread of the heavy duty pneumatic tire for the comparative example. FIG. 4(*b*) is a sectional view taken along a line D-D' of the heavy duty pneumatic tire shown in FIG. 4(*a*).

As shown in FIGS. 4(*a*) and 4(*b*), the circumferential grooves 34 are disposed on a tread TR11 where positions of groove deepest portions 34*btm* vary along a circumferential direction of the tread TR11.

Although the construction of the circumferential grooves 34 is almost equal to that of the circumferential groove 33, the cycle ($\lambda$) and an effective groove cross-sectional area (S') thereof are different from those of the circumferential groove 33.

(Constitution of the Circumferential Groove of the Pneumatic Tire for the Comparative Example)

A specific constitution of the circumferential groove 34 will be described with reference to FIG. 5. FIG. 5(*a*) is an expanded view showing the circumferential groove 34 disposed to the tread TR11.

In addition, FIGS. 5(*b*) and 5(*c*) are cross-sectional views, respectively taken along lines E1-E1' and E2-E2'. As shown in FIG. 5(*b*), in a cross-section of the circumferential groove 34 taken along the line E1-E1', a depth direction position on a side of the shoulder ribs 11 is set to 2 mm from a surface of the tread TR11. Meanwhile, a depth direction position on a side of the second ribs 12 is set to be located almost on the surface of the tread TR11. Furthermore, in the cross-section of the circumferential groove 34 taken along the line E1-E1', $\alpha 1$ and $\alpha 2$ are set to 43° and 5°, respectively.

As shown in FIG. 5(*c*), in a cross-section of the circumferential groove 34 taken along the line E2-E2', the depth direction position on the side of the shoulder ribs 11 is set to be located almost on the surface of the tread TR11. Meanwhile, the depth direction position on the side of the second ribs 12 is set to 2 mm from the surface of the tread TR11. In the cross-section of the circumferential groove 34 taken along the line E2-E2', $\alpha 1$ and $\alpha 2$ are set to 5° and 43°, respectively. In FIGS. 5(*b*) and 5(*c*), the depth of the groove deepest portion 34*btm* is set to 15.5 mm. In addition, in FIGS. 5(*b*) and 5(*c*), the width of the circumferential groove 34 is set to 16.0 mm.

As shown in FIG. 5(*a*), cross-sectional shapes of the heavy duty pneumatic tire of the comparative example shown in FIGS. 5(*b*) and 5(*c*) repeat in a predetermined cycle ($\lambda$). Furthermore, the heavy duty pneumatic tire of the comparative example satisfies the features 1 to 3 of the heavy duty pneumatic tire of the aforementioned embodiment.

(Comparative Evaluations)

Next, experimental methods for conducting comparative evaluations and experimental results are described, which comparative evaluations are for the heavy duty pneumatic tire of this embodiment shown in FIGS. 2(*a*) and 2(*b*), and FIGS. 3(*a*) to 3(*e*) (Present embodiment); the heavy duty pneumatic tire of the comparative example shown in FIGS. 4(*a*) and 4(*b*), and FIGS. 5(*a*) to 5(*c*) (Comparative example); and the heavy duty pneumatic tire of a conventional example shown in FIG. 1(*a*) to 1(*c*) (Conventional example).

(1) Experimental Method

Experiments on the comparative evaluations are carried out for (a) wear performance of shoulder ribs, (b) wet performance, and (c) drive noise performance.

Experiments for (a) wear performance of shoulder ribs and (b) wet performance are conducted in a manner that the pneumatic tires for this embodiment, the comparative example, and the conventional example are actually mounted on vehicles. Experimental conditions are as follows.

- used tire size: 11R22.5
- used rim size: 8.25×22.5
- settings of tires internal pressure: 830 kPa
- kinds of vehicles: front single axle, drive double axle (2-DD truck)
- mounted position: front wheel
- front wheel load: 28.01 kN (loaded vehicle:loading ratio 100%)
- speed: 0-80 km/h
- distance traveled: 100,000 km In the experiment for the heavy duty pneumatic tire of this embodiment, the cycle (λ) of the circumferential groove was set to 39% to the contact length (L). In addition, as shown in FIG. 6(a), the pneumatic tire for heavy load, of which the effective groove cross-sectional area $S_1'$ was set to 55.5% to the maximum groove cross-sectional area S, was used. In the experiment for the heavy duty pneumatic tire of the comparative example, as shown in FIG. 6(b), the heavy duty pneumatic tire, of which the effective groove cross-sectional area $S_2'$ was set to 40.7% to the maximum groove cross-sectional area S, was used. FIG. 6(c) is a cross-section of the effective groove cross-sectional area $S_3'$ of the heavy duty pneumatic tire of the conventional example shown in FIG. 1, as reference.

(2) Experimental Results (a) Wear performance of Shoulder Ribs

The wear performance of shoulder ribs was evaluated at the shoulder ribs 11 and the second ribs 12 by use of quotients which represent the wear performance (uneven wear) of each of the heavy duty pneumatic tires. The quotients were obtained by averaging differences of the amounts of wear between on one edge portion on a side where a lateral force is applied to the width direction of the tread and on the other edge portion on a side where the lateral force is outputted, and by setting the amount of wear of the heavy duty pneumatic tire of the conventional example as 100. Table 1 shows the wear performance of shoulder ribs for this embodiment, the comparative example, and the conventional example.

TABLE 1

|  | Uneven wear quotient |
|---|---|
| Present embodiment | 85 |
| Comparative example | 84 |
| Conventional example | 100 |

In Table 1, the smaller a value of the quotient is, the smaller the difference in the amounts of wear on both edges of the ribs is. This means a smaller value shows higher wear performance. Table 1 shows that the uneven wear at the shoulder ribs both of the heavy duty pneumatic tires of this embodiment, and of the comparative example was suppressed to a large extent compared with that of the conventional example.

(b) Wet Performance

The wet performance was evaluated by use of quotients which represent braking distances of each of the heavy duty pneumatic tires. The quotients are obtained by measuring the braking distances where a vehicle running at 80 km/h comes to a complete stop on the ground submerged 5 mm below a surface of water, and by setting the braking distance of the heavy duty pneumatic tire of the conventional example as 100. Table 2 shows the wet performance for this embodiment, the comparative example, and the conventional example.

TABLE 2

|  | Wet performance quotient |
|---|---|
| Present embodiment | 93 |
| Comparative example | 105 |
| Conventional example | 100 |

In Table 2, the smaller a value is, the shorter the braking distance is, and a smaller value shows higher wet performance. The wet performance of the heavy duty pneumatic tire of the comparative example is not improved compared to that of the conventional example and, however, in the present embodiment, the braking distance becomes shorter and the wet performance is improved.

Herein, a reason why the wet performance of the heavy duty pneumatic tire of the comparative example is not improved is that, the effective groove cross-sectional area $S_1'$ of the heavy duty pneumatic tire of in the comparative example was set to 40.7% to the maximum groove cross-sectional area S, while that of the present embodiment was set to 55.5% to the maximum groove cross-sectional area S. That is, it is preferable that the relationship between the effective groove cross-sectional area S' and the maximum groove cross-sectional area S satisfies $S' \geqq 0.45S$ as described above.

(c) Drive Noise Performance

On the noise experiment, a single bench testing was conducted by using a drum testing machine. To be more specific, each of the heavy duty pneumatic tires was rotated on a drum at a rotation speed corresponding to 80 km/h, and a peak value of an acoustic pressure at 1 kHz was measured respectively. The drive-noise performance was evaluated by use of quotients, which represents the drive noise performance of each of the heavy duty pneumatic tires by setting the noise of the heavy duty pneumatic tire of the conventional example as 100. Table 3 shows the drive noise performance for this embodiment, the comparative example, and the conventional example.

TABLE 3

|  | Noise quotient |
|---|---|
| Present embodiment | 96 |
| Comparative example | 94 |
| Conventional example | 100 |

In Table 3, the smaller a value is, the lower the acoustic pressure is. This means that a smaller value means the higher drive noise performance. As shown in Table 3, in the heavy duty pneumatic tires for this embodiment and the comparative example, noises were reduced compared with that of the conventional example.

(Operation and Effect)

As described above, when the lateral force is applied to the pneumatic tire of this embodiment, especially, the heavy duty pneumatic tire, the deformation positions of the groove bottom surface of the circumferential groove 33 and the side surfaces of the shoulder ribs 11 are dispersed, whereby the shrinkage of the circumferential groove 33, i.e. the displacement of the shoulder ribs 11 in the width direction of the tread TR10, is able to be suppressed.

Moreover, when the displacement of the shoulder ribs 11 in the width direction is suppressed, it is possible to reduce shear forces which occurs in an interior direction of the tread TR10 when the shoulder ribs are kicked. Therefore it suppresses the uneven wear of the shoulder ribs, in concrete terms, a loss of one of the edges of the shoulder ribs or the like, taper wear, and heel and toe wear (H & T wear) which occurs when the tread is worn by repeatedly sheared in a certain direction.

Furthermore, in this embodiment, since the relationship between the effective groove cross-sectional area $S_1'$ of the circumferential groove 33 and the maximum groove cross-sectional area S satisfies $S_1' \geqq 0.45S$, it is possible to suppress the uneven wear of the shoulder ribs caused by the shrinkage of the circumferential groove 33, and simultaneously to enhance drainage performance further.

Moreover, the circumferential groove 33 of this embodiment has a more effective shape compared with that of the conventional example for reducing air column resonance (pattern air pumping sound), whereby the so-called driving noise is able to be suppressed.

Modified Embodiment

Although the contents of the present invention have been disclosed through a particular embodiment of the present invention, it is not to be understood that the descriptions and the figures, which are included in this disclosure of the present invention, do not limit the present invention. It will be apparent to a person with an ordinary skill in the art that various changes or modifications of alternative embodiments and operating technology will be made within a scope of the present invention.

Figure 7:
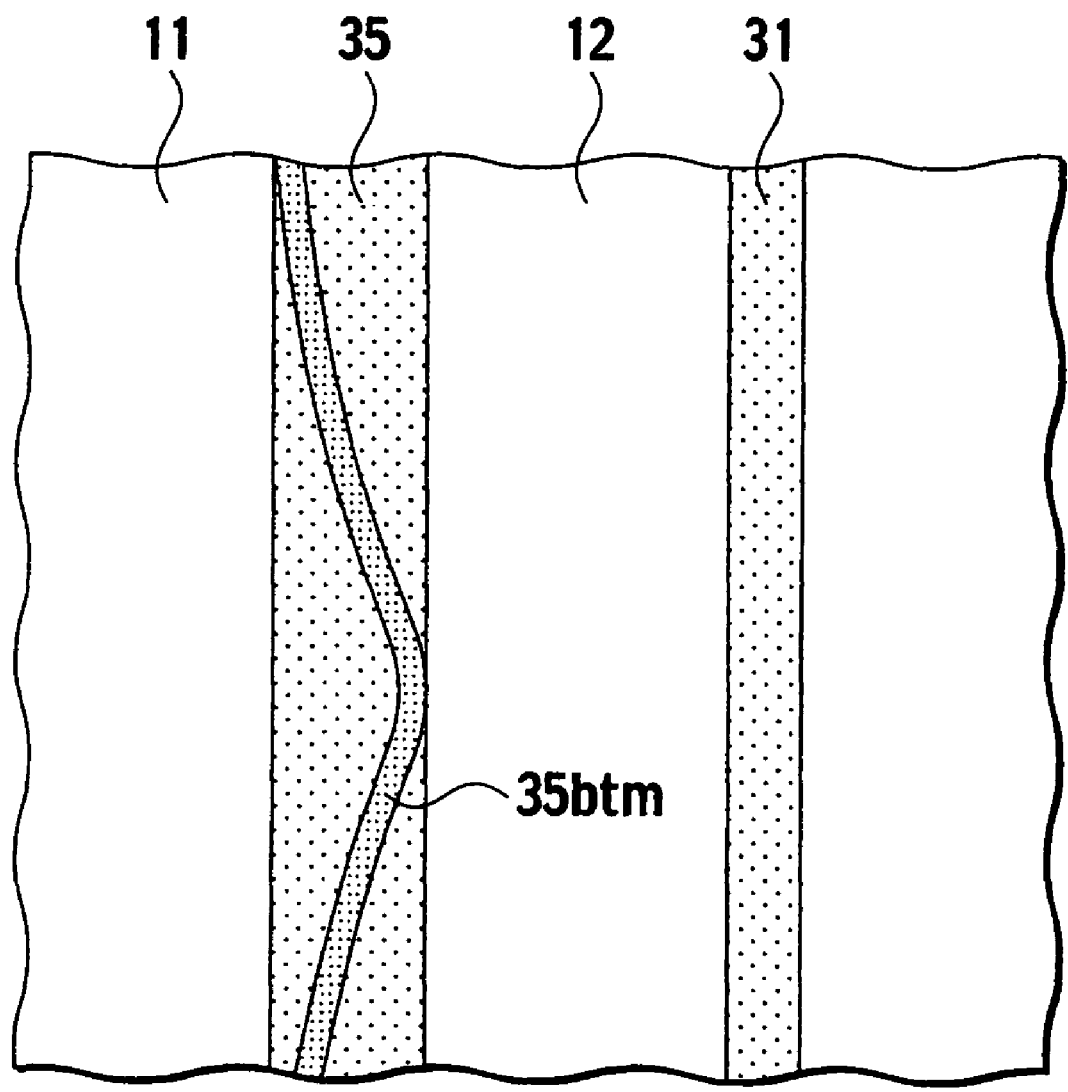
FIG. 7 is an expanded plan view showing a portion of a tread of a pneumatic tire of a modified example of the present invention.

For example, the heavy duty pneumatic tire of the present invention can be modified as follows. FIG. 7 shows a modification of the circumferential groove 33 disposed on the tread TR10 of the heavy duty pneumatic tire of this embodiment shown in FIGS. 2(a) and 2(b) and FIGS. 3(a) to 3(e). In place of the circumferential groove 33, in FIG. 7, an expanded plan view showing a portion of a tread disposed on a circumferential groove 35 is shown.

Although the groove deepest portions 33*btm* of the circumferential groove 33 are varied in a stepwise manner at every fixed interval (intervals from SC1 to SC6) for the heavy duty pneumatic tire of this embodiment shown FIGS. 2(a) and 2(b) and FIGS. 3(a) to 3(e), a position of a groove deepest portion may continuously and smoothly varies, as in the case of the groove deepest portion 35*btm*, in a predetermined cycle (for example, a cycle satisfying the relationship of the cycle ($\lambda$)$\leqq$the contact length (L/2).

In addition, depth direction positions (positions of the contact points $V_1$ and $V_2$) of the circumferential groove 35, and angles ($\alpha 1$, $\alpha 2$, $\beta 1$, and $\beta 2$) formed by a groove bottom surface and perpendicular lines P (perpendicular lines $P_1$ and $P_2$) may continuously and smoothly varies in a predetermined cycle.

Even when the position of the groove deepest portion or the like varies continuously and smoothly in a predetermined cycle as in the circumferential groove 35, the aforementioned effect of the present invention can be still realized.

As described above, various forms of embodiments not described above are, of course, included in a range of the present invention. Accordingly, a technical scope of the present invention is defined only by claims for requiring a patent, which are relevant by the forgoing description.

INDUSTRIAL APPLICABILITY

Therefore, since the pneumatic tire of the present invention is capable of suppressing uneven wear caused by a lateral force applied in a width direction of a tread and of improving wet performance further, it is useful in manufacturing technology for pneumatic tires.

The invention claimed is:
1. A pneumatic tire, comprising:
circumferential grooves disposed along a circumferential direction of a tread; and
land portions divided by the circumferential grooves,
wherein positions of groove deepest portions in the circumferential grooves vary in a predetermined cycle along the circumferential direction in a width direction of the tread within the circumferential grooves,
wherein in the land portions, depth direction positions, where a groove bottom surface of the circumferential groove contacts with each of perpendicular lines which are perpendicular or approximately perpendicular to the tread surface, which passes respectively through each of a plurality of edges on a side of each of the circumferential grooves, vary in a radial direction in the predetermined cycle along the circumferential direction;
angles, which are formed by the perpendicular lines and a section line of a cross-section of the groove bottom surface in the width direction of the tread surface with a vertex in the depth direction positions, vary in the predetermined cycle along the circumferential direction;
a cross sectional shape of the circumferential groove varies in a stepwise manner along the circumferential direction of the tread.
2. The pneumatic tire of claim 1 characterized in that when a maximum groove cross-sectional area S is defined as an area of a rectangle formed by each of the edges of the land portions on the side of the circumferential groove and by points where the perpendicular lines, which are perpendicular or approximately perpendicular to the tread surface and which pass through the edges, intersect perpendicularly with a line which is parallel to the tread surface and tangent to the groove deepest portion, an effective groove cross-sectional area S' corresponding to a portion forming the circumferential groove along the entire circumferential direction satisfies $S' \geqq 0.45S$ in the maximum groove cross-sectional area S.
3. The pneumatic tire of claim 2 characterized in that, when an angle close to a rotation center of the tire is denoted as $\alpha 1$ and an angle close to the tread surface is denoted as $\beta 1$, the angles being respectively formed, with a vertex in the depth direction position, by one of the perpendicular lines and the section line of the cross-section of the groove bottom surface in the width direction, at which the groove bottom surface contacts with the perpendicular line passing through the edge of the land portion disposed on the shoulder side of the tread, and when an angle close to the rotation center of the tire is denoted as $\alpha 2$ and an angle close to the tread surface is denoted as $\beta 2$, the angles being respectively formed, with a vertex in the depth direction position, by the other of the perpendicular line and the section line of the cross-section of the groove bottom surface in the width direction, at which the groove bottom surface contacts with the perpendicular line passing through an edge of a second land portion which is the land portion disposed on a center side of the tread, a relationship $\alpha 2 < \beta 2$ is satisfied in a region where a relationship $\alpha 1 > \beta 1$ is satisfied, and a relationship α2>β2 is satisfied in a region where a relationship α1<β1 is satisfied.

4. The pneumatic tire of claim 1 characterized in that, when an angle close to a rotation center of the tire is denoted as α1 and an angle close to the tread surface is denoted as β1, the angles being respectively formed, with a vertex in the depth direction position, by one of the perpendicular lines and the section line of the cross-section of the groove bottom surface in the width direction, at which the groove bottom surface contacts with the perpendicular line passing through the edge of the land portion disposed on the shoulder side of the tread, and when an angle close to the rotation center of the tire is denoted as α2 and an angle close to the tread surface is denoted as β2, the angles being respectively formed, with a vertex in the depth direction position, by the other of the perpendicular line and the section line of the cross-section of the groove bottom surface in the width direction, at which the groove bottom surface contacts with the perpendicular line passing through an edge of a second land portion which is the land portion disposed on a center side of the tread, a relationship α2<β2 is satisfied in a region where a relationship α1>β1 is satisfied, and a relationship α2>β2 is satisfied in a region where a relationship α1<β1 is satisfied.

5. The pneumatic tire of claim 1, wherein the predetermined cycle along the circumferential direction is less than or equal to half of a contact length of the tread, wherein the contact length is a length where the tread contacts a ground.

6. The pneumatic tire of claim 1, wherein a shape of a cross section of each of the circumferential grooves is asymmetric along more than 70% of the circumferential direction.

7. The pneumatic tire of claim 1, further comprising inner grooves disposed along the circumferential direction of the tread at a radial position inside of the circumferential grooves.

8. The pneumatic tire of claim 1, wherein a top edge of the circumferential grooves is straight along the entire circumferential direction.

9. The pneumatic tire of claim 1, wherein the circumferential groove is formed linearly.

* * * * *